United States Patent
Yoshida et al.

(10) Patent No.: US 9,608,908 B2
(45) Date of Patent: Mar. 28, 2017

(54) NETWORK SYSTEM AND VLAN TAG DATA ACQUIRING METHOD

(75) Inventors: Hirokazu Yoshida, Tokyo (JP); Yoji Suzuki, Tokyo (JP); Masanori Takashima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 265 days.

(21) Appl. No.: 14/007,341

(22) PCT Filed: Mar. 21, 2012

(86) PCT No.: PCT/JP2012/057218
§ 371 (c)(1),
(2), (4) Date: Sep. 25, 2013

(87) PCT Pub. No.: WO2012/133060
PCT Pub. Date: Oct. 4, 2012

(65) Prior Publication Data
US 2014/0016647 A1    Jan. 16, 2014

(30) Foreign Application Priority Data

Mar. 29, 2011  (JP) ................................. 2011-072153

(51) Int. Cl.
*H04L 12/801* (2013.01)
*H04L 12/46* (2006.01)
*H04L 12/721* (2013.01)

(52) U.S. Cl.
CPC .......... *H04L 47/10* (2013.01); *H04L 12/4641* (2013.01); *H04L 12/4666* (2013.01); *H04L 45/38* (2013.01); *H04L 12/465* (2013.01)

(58) Field of Classification Search
CPC ......... H04L 47/10; H04L 12/56; H04L 12/26; G06F 15/173; G06F 15/16
See application file for complete search history.

(56) References Cited

U.S. PATENT DOCUMENTS

2003/0188013 A1*  10/2003  Nishikado ............... H04L 67/42
                                                                  709/238
2005/0180391 A1*   8/2005  Shimada ............. H04L 12/4645
                                                                  370/351
(Continued)

FOREIGN PATENT DOCUMENTS

CN       101064682 A      10/2007
CN       101107824 A       1/2008
(Continued)

OTHER PUBLICATIONS

English translation of PCT/ISA/237 (written opinion of the international searching authority, dated Jun. 26, 2012).
(Continued)

*Primary Examiner* — Anez Ebrahim
(74) *Attorney, Agent, or Firm* — McGinn IP Law Group, PLLC

(57) ABSTRACT

In the present situation, a switch cannot identify inner tag data (VLAN ID data before QinQed in the input of OF-NW) given to each of packets which flow in an open flow network (OF-NW). Therefore, OF-NW composed only one VLAN cannot handle a plurality of VLANs. Specifically, a controller handles a plurality of VLANs in the OF-NW in which there is only one VLAN, by mapping the inner tag data given to the packets which flow through the OF-NW, and flow cookie data showing the flow entry corresponding to the packets which flow through the OF-NW. Specifically, the flow flowing into the OF-NW is transferred from the switch to the controller, and the controller learns VLAN ID data in the input of the OF-NW, and handles the plurality of VLANs by mapping this VLAN ID and the flow cookie data showing the flow entry corresponding to the packet in the OF-NW.

1 Claim, 3 Drawing Sheets

(56) References Cited

U.S. PATENT DOCUMENTS

| | | | |
|---|---|---|---|
| 2008/0049621 A1 | 2/2008 | McGuire et al. | |
| 2008/0199180 A1* | 8/2008 | Yang ................ | H04L 12/4666 398/58 |
| 2011/0286324 A1* | 11/2011 | Bellagamba ........ | H04L 41/0677 370/219 |

FOREIGN PATENT DOCUMENTS

| | | |
|---|---|---|
| JP | 2004-165794 A | 6/2004 |
| JP | 2008-527772 A | 7/2008 |
| JP | 2009-177281 A | 8/2009 |
| JP | 2009-177282 A | 8/2009 |
| JP | 2009-201142 A | 9/2009 |
| WO | WO 2004/095780 A1 | 11/2004 |
| WO | WO 2006-070197 A2 | 7/2006 |

OTHER PUBLICATIONS

PCT/IB/373 dated Oct. 2, 2013.
International Search Report in PCT/JP2012/057218 dated Jun. 26, 2012 (English Translation Thereof).
"OpenFlow Switch Specification, Version 1.0.0", [online] (Dec. 31, 2009) (searched on Mar. 24, 2011), the Internet (URL: http://www.openflowswitch.org/documents/openflow-spec-v1.0.0.pdf).
802.1q Tunneling (Q-in-Q) [online] (searched Mar. 24, 2011) the Internet (URL: http://www.infraexpert.com/study/vlan2.3.htm).
OpenFlow Switch Specification Version 1.1.0 Implemented (Wire Protocol 0x02), Feb. 28, 2011.
Chinese Office Action dated Aug. 3, 2015 with an English translation.

* cited by examiner

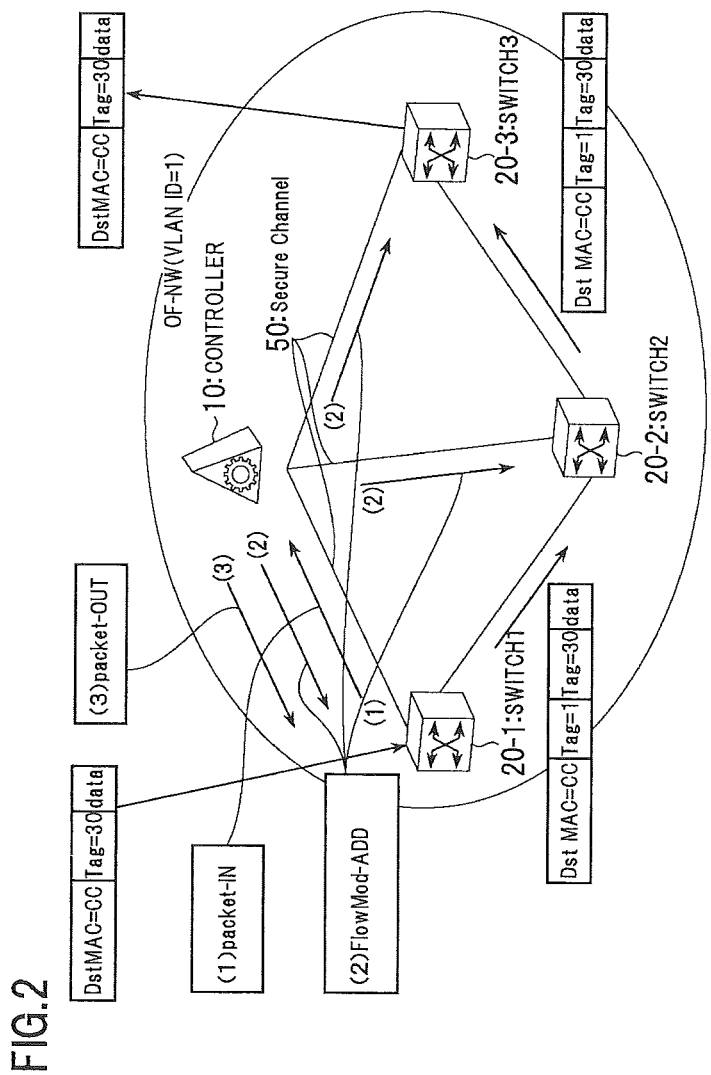

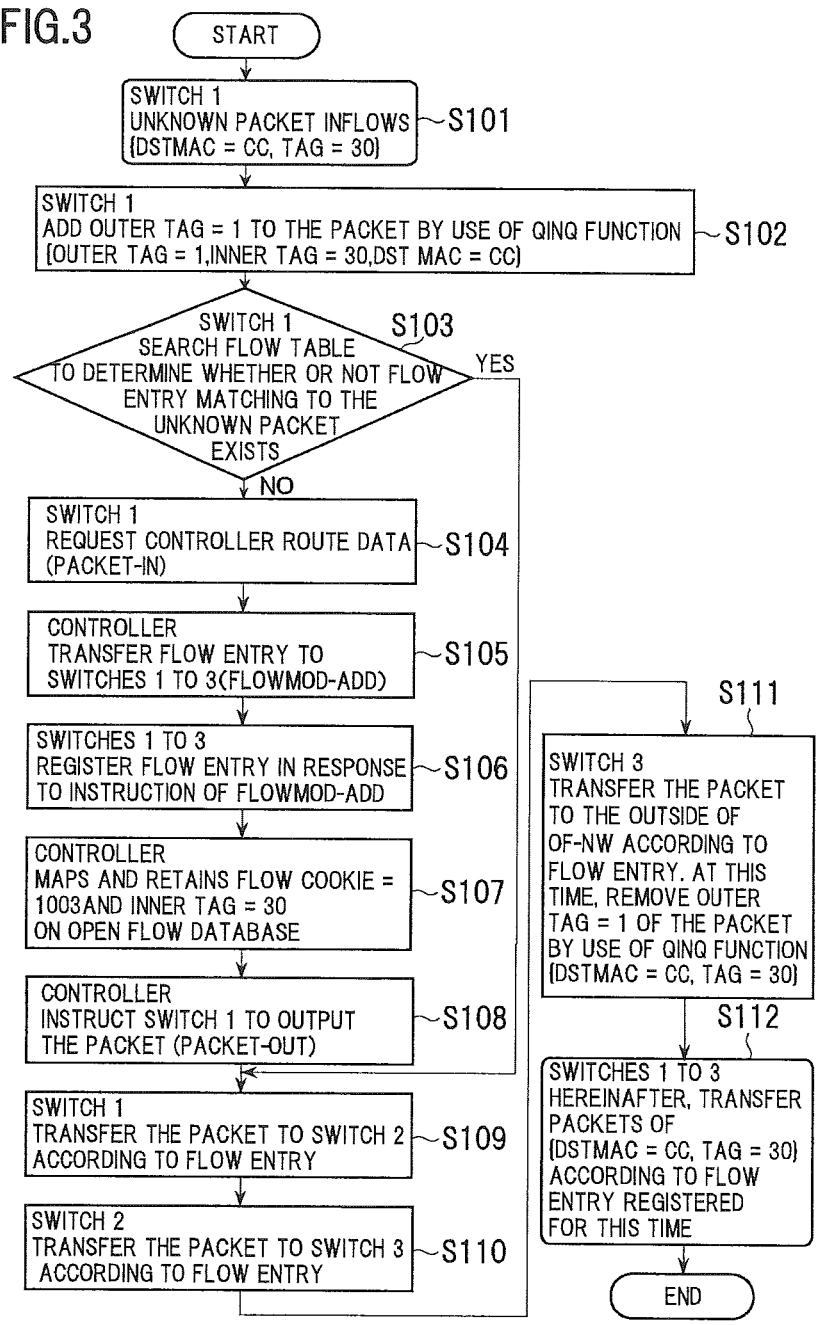

NETWORK SYSTEM AND VLAN TAG DATA ACQUIRING METHOD

TECHNICAL FIELD

The present invention relates to a network system, and especially to a VLAN tag data acquiring method in an open flow network.

BACKGROUND ART

A conventional network equipment is a black box, so that flexible control such as a load distribution and lean control cannot be carried out from the outside. Therefore, when the scale of the network becomes large, it becomes difficult to check the detection and improvement of an operation of a system, and a large volume of cost is required for a change of the design and the structure.

As a technique to solve such a problem, a technique is considered in which a packet transfer function and a route control function of the network equipment is separated. For example, the network equipment performs the packet transfer function and a control unit which is separated from the network equipment performs the route control function, so as to realize easier control and construction of more flexible network.

(Explanation of CD Separation Type Network)

As an example of the networks in which the functions are separated, a CD (C: control plane /D: data plane) separation type network is proposed in which a node unit on the data plane side is controlled by a control unit on the control plane side.

As an example of the CD separation type network, an open flow network (OF-NW) using the open flow (Open-Flow) technique is exemplified in which a controller controls switches to carry out a route control of the network. The details of the open flow technique have been described in Non-Patent Literature 1. It should be noted that the opening flow network (OF-NW) is an example only.

(Explanation of Open Flow Network (OF-NW))

In the open flow network (OF-NW), an open flow controller (OFC), which is equivalent to the control unit, controls the operation of the open flow switches (OFS) by operating flow tables for the route control of the open flow switches (OFS) which are equivalent to node units.

Hereinafter, for the specified simplification, the open flow controller (OFC) is referred to as a "controller" and the open flow switch (OFS) is referred to as a "switch".

The controller and the switch are connected by a control channel (communication channel for control) called "secure channel" which is a communication path protected by the dedicated line and SSL (SecureSocketLayer). The controller and the switch transmit and receive an open flow message as a control message which conforms to (is based on) open flow protocol through the control channel.

The switches in the open flow network (OF-NW) are arranged in the open flow network (OF-NW) as edge switches or core switches under the control of the controller. A flow of the packets from the reception of packets in the edge switch (ingress switch) on an entrance side in the open flow network (OF-NW) to the transmission from the edge switch (egress witch) of the output side is called a flow. In the open flow network (OF-NW), communication is captured as the flow of end to end (E2E) and a route control, a fault recovery, a load distribution, and an optimization are carried out in flow unit.

A packet may be read as a frame. A difference between the packet and the frame is only a difference in a data unit handled in protocol (PDU). The packet is a PDU of "TCP/IP" (Transmission Control Protocol/Internet Protocol). On the other hand, the frame is a PDU of the "Ethernet (registered trademark)".

The flow table is a set of flow entries, each of which defines a determination condition (rule) to specify packets as a flow, statistical data of the number of times that the packets matched to the rule, and a processing content (action) to be carried out to the packets.

The rule of the flow entry is defined based on combinations of data in various protocol hierarchal layers which are contained in a header field of the packet and is identifiable. As an example of the data of the various protocol hierarchal layers, a destination address, a source address, a destination port, a source port and so on are exemplified. It should be noted that the above address contains a MAC address (Media Access Control Address) and an IP address (Internet Protocol Address). Also, data of an input port (ingress port) can be used for the rule of the flow entry in addition to the above data. Also, the normal expression of a part or all of a value of the header field of each of the packets as the flow as the rule of the flow entry or the expression of it by using wildcard "*" can be set.

The action of the flow entry shows an operation such as "output to a specific port", "discard", and "rewrite a header". For example, the switch outputs the packet to the specified port if identification data (output port number and so on) of the output port is specified in the action of the flow entry, and the switch discards the packet if the identification data of the output port is not shown. Or, the switch rewrites the header of the packet based on header data if the header data is shown in the action of the flow entry.

The switch carries out the action of the flow entry to the packet group (a flow of packets) which matches the rule of the flow entry. Specifically, when receiving the packet, the switch searches the flow table for the flow entry which has the rule matching to the header data of the received packet. When the matching flow entry as a result of the search is found out, an operation of updating the statistical data of the flow entry and an operation specified as the action of the flow entry to the received packet are carried out. On the other hand, When the matching flow entry is not found out as the search result, it is determined that the received packet is a first packet. The switch transfers a received packet (or a copy of it) to the controller in the open flow network (OF-NW) through the control channel, requests a route calculation for the received packet based on a source address and a destination address and so on of the received packet. The switch receives a message to set a flow entry as a reply and updates the flow table.

It should be noted that a default entry having a rule which matches the header data of all the packets in a low priority is registered on the flow table. The flow entry matching the received packet matches the others. When not found out, the received packet matches this default entry. The action of the default entry is a "transmission of an inquiry of the received packet to the controller".

In this way, in the open flow network (OF-NW), the controller controls the flow table of the switch and the switch carries out transfer processing of the flow according to the flow table.

(VLAN Oft Existing Open Flow Network)

VLAN (Virtual Local Area Network) can be built in the open flow network (OF-NW).

It is called VLAN tagging (tagging) that an identification number (VLAN-ID) which is peculiar to a VLAN group to which the packet belongs is given (given VLAN tag) to the packet (MAC frame and so on) which flows through the network in the form of a tag header.

Which VLAN group the packet belongs to can be determined by referring to this VLAN tag data (VLAN-ID), even if a network is configured from a plurality of switches.

It should be noted that a technique of identifying traffic by adding a VLAN tag which is peculiar to a user to the packet from the user is called a tag VLAN. On the other hand, it considers that it uses VLAN tag in the user base and a technique of doubly giving a tag used only in a communication provider network is called an extension tag VLAN. As one of the functions which realize the extension tag VLAN, the "QinQ function" (IEEE802.1q Tunneling) is disclosed in Non-Patent Literature 2.

The "QinQ function" is a function of identifying the packet of the user in a predetermined network. For example, when the QinQ function is installed in the edge switch, the edge switch gives an extension tag to the packet flowing into the network by the QinQ function.

It should be noted that when the VLAN tag is doubly added to the packet, the first tag from the head of the packet is called "outer tag data" and the second tag is called "inner tag data".

The role/use purpose of the inner tag data and the outer tag data are the same as the VLAN tag.

Here, it is supposed that the extension tag which is given by an equipment (edge switch and so on) which performs the QinQ function on the input side of the open flow network (OF-NW) is the "outer tag data", and the original VLAN tag before the extension tag is given to the packet is the "inner tag data".

In the present situation, the switch can recognize only the outer tag data as the first tag from the head of the packet. Therefore, the switch cannot identify the inner tag data of the packet which flows through the open flow network (OF-NW).

Therefore, in the open flow network (OF-NW) having only one VLAN, a plurality of VLANs could not be handled.

It should be noted that as the related technique, Patent Literature 1 (JP 2009-177281A) and Patent Literature 2 (JP 2009-177282A) disclose a network system in which when relaying a packet in a network which is provided with a plurality of VLANs, the packet is transferred by using double tags.

Also, a technique of the VLAN Tunneling protocol is disclosed in Patent Literature 3 (JP 2009-201142A). In this technique, a packet is tunneled through a label switched path (LSP) according to a multi-protocol label switching (MPLS) protocol. In the second switching node from the end of the LSP, a current label value is replaced with a label value reserved for a packet transmitted from a port related to the VLAN. The LSP output switching node receives the packet with the reserved label value, recognizes that VLAN data has been embedded in the packet, and takes out a destination address to transmit the packet to a final destination.

CITATION LIST

[Patent literature 1] JP 2009-177281A
[Patent literature 2] JP 2009-177282A
[Patent literature 3] JP 2009-201142A
[Non-patent literature 1] "OpenFlow switch Specification, Version 1.0.0", [online] (Dec. 31, 2009) (searched on Mar. 24, 2011), the Internet (URL: http://www.openflowswitch.org/documents/openflow-spec-v1.0.0.pdf)
[Non-patent literature 2] "802.1q Tunneling (Q-in-Q)" [online] (searched Mar. 24, 2011) the Internet (URL: http://www.infraexpert.com/study/vlan2.3.htm)

SUMMARY OF THE INVENTION

An object of the present invention is to provide a method of acquiring VLAN tag data in an open flow network.

A network system according to the present invention includes switches, and a controller configured to set a flow entry defining a rule and an action to uniformly control packets as a flow to a flow table of each of the switches. The controller maps and retains tag data of each packet which flows through the network and flow cookie data showing the flow entry corresponding to the packet and virtually handles a plurality of VLANs (Virtual Local Area Network).

A method of acquiring VLAN tag data according to the present invention which is executed by a computer, includes: setting to a flow table of a switch, a flow entry defining by a rule and an action to uniformly control packets as a flow; mapping and retaining tag data of each of the packets which flows in a network and flow cookie data showing the flow entry corresponding to the packet; and virtually handling a plurality of VLANs (Virtual Local Area Network).

A program according to the present invention is a program to make a computer execute the above-mentioned method of acquiring VLAN tag data. It should be noted that the program according to the present invention can be stored in a storage unit and a storage medium.

A plurality of VLANs can be handled in the open flow network having only one VLAN.

BRIEF DESCRIPTION OF THE DRAWINGS

FIG. 2 is a diagram showing the configuration of an open flow network using the network system according to the present invention; and FIG. 3 is a flow chart showing an operation example of processing in case of the packet inflow of the present invention.

DESCRIPTION OF EXEMPLARY EMBODIMENTS

[Exemplary Embodiments]

Figure 1:
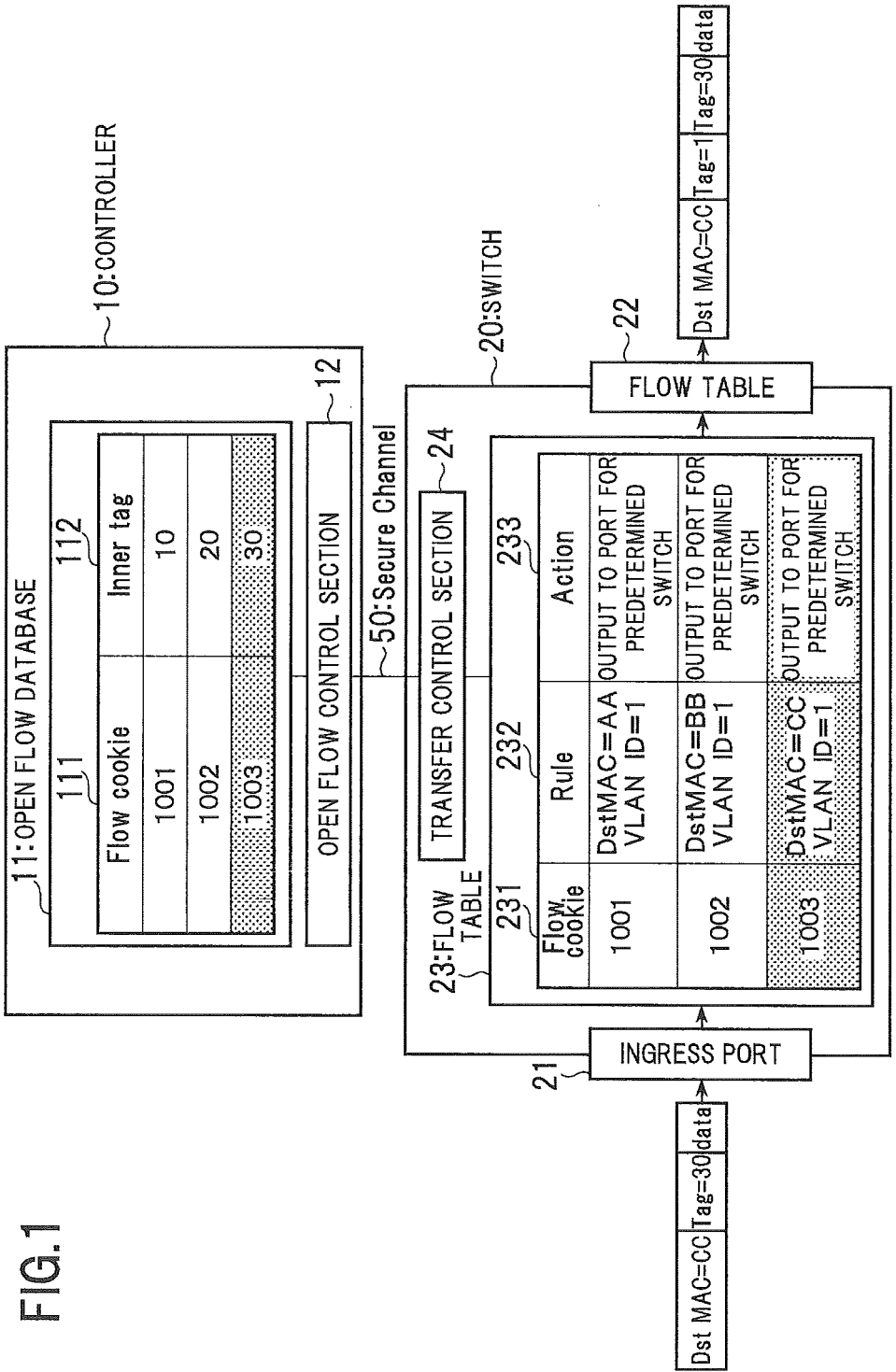
FIG. 1 is a diagram showing a basic configuration example of the network system according to the present invention.

Hereinafter, exemplary embodiments of the present invention will be described with reference to the attached drawings.

The present invention deals with a CD separation type network. In this case, an open flow network which is one of the CD separation type networks will be described, using it as an example. However, actually, the present invention is not limited to the open flow network.

(System configuration)

As shown in FIG. 1, the network system according to the present invention is provided with a controller 10 and switches 20 (20-i, i=1 to n: n is the number of switches).

The controller 10 calculates a packet transfer route when detecting the switch 20 (20-i, i=1 to n) based on topology data showing a connection status of the network, and registers a flow entry on a flow table of the switch related to the route.

The controller 10 is connected with each of the switches 20 (20-i, i=1 to n) with a secure channel 50 on a control line as a transmission path of a control message. Therefore, the secure channels 50 exist for the number of switches 20 (20-i, i=1 to n).

Each of the switches 20 (20-i, i=1 to n) transfers a received packet based on the flow entry registered on its own flow table.

(Details of Controller)

The controller 10 is provided with an open flow database 11 and an open flow control section 12.

The open flow database 11 contains flow cookie data ill and inner tag data 112.

The flow cookie data 111 is an identification data to identify the flow entry uniquely.

The inner tag data 112 is a VLAN tag (VLAN-ID) before given to the packet.

That is, the inner tag data 112 is identification data to uniquely identify each of a plurality of VLANs which are used outside the open flow network (OF-NW).

In this case, the open flow database 11 retains data obtained by mapping the flow cookie data 111 and the inner tag data 112.

The open flow control section 12 carries out the management of the open flow database 11 and the control of the switches 20 (20-i, i=1 to n) based on the registration data of the open flow database 11. The open flow control section 12 controls the switch (20-i, i=1 to n) through the secure channel 50 used for the controller 10 to control the switch 20 (20-i, i=1 to n) while conforming the open flow protocol.

(Details of Switch)

Each of the switches 20 (20-i, i=1 to n) is provided with an input port 21, an output port 22, a flow table 23 and a transfer control section 24.

The input port 21 is an interface (I/F) for packet input/output and is a communication port to receive (input) a packet. The input port 21 may be plural.

The output port 22 is an interface (I/F) for packet input/output and is a communication port to transmit (output) a packet. The output port 22 may be plural.

The flow table 23 is a table on which flow entry is registered by the controller 10.

Each flow entry contains flow cookie data 231, a flow determination condition (Rule) 232 and action 233.

The flow cookie data 231 is identification data to identify the flow entry uniquely. The flow cookie data 231 corresponds to the flow cookie data 111.

The flow determination condition (Rule) 232 is a rule of the flow entry and is identification data to identify a flow uniquely. For example, the flow determination condition (Rule) 232 defines a combination of values of the header field of the packet. In this case, the flow determination condition (Rule) 232 is defines a value of "Dst MAC" (destination MAC address) and a value of "VLAN ID" of the values of the header field of the packet to identify a flow uniquely.

The action 233 is an action of the flow entry and is data about a processing content to the packet corresponding to the flow determination condition (Rule) 232. In this case, the action 233 defines an output to a port for a predetermined switch when the reception packet matches the flow determination condition (Rule) 232. It should be noted that the action 233 defines the output to an output port corresponding to the destination switch.

The transfer control section 24 processes a packet according to the registration data (flow entry) of the flow table 23. For example, the transfer control section 24 outputs the packet which has arrived at the input port 21, to the output port 22 corresponding to a predetermined destination according to the flow entry of the flow table 23. Or, the transfer control section 24 transfers the packet to the controller 10. Or, the transfer control section 24 discards the packet.

Also, the transfer control section 24 transmits and receives a control message through the secure channel 50 with the open flow control sections 12 of the controller 10. The transfer control section 24 changes the flow entry of the flow table 23 according to the control message from the open flow control section 12 of the controller 10 (i.e. carries out registration, update, deletion and so on).

(Configuration Diagram of Open Flow Network)

FIG. 2 is a diagram showing the configuration of the open flow network (OF-NW) using the network system according to the present invention.

The open flow network (OF-NW) has only one "VLAN=1" and contains the controller 10 and the switches 20 (20-i, I=1 to 3).

In this case, the switch 20-1 is a "switch 1", the switch 20-2 is a "switch 2", and the switch 20-3 is a "switch 3".

A QinQ function is set to a port, which is connected with an equipment outside the open flow network (OF-NW), of the input ports 21 and the output ports 22 which are the interfaces (I/F) for the packet input/output of the switch 1 (switch 20-1), the switch (switch 20-2), and the switch 3 (switch 20-3).

It supposes that the following mappings have been carried out in the open flow database 11 of the controller 10.

The controller 10:
{flow cookie=1001, inner tag=10}
{flow cookie=1002, inner tag=20}

Also, it is supposed that the following flow entries have been registered on the flow tables 23 of the switch 1 (switch 20-1), the switch 2 (switch 20-2), and the switch 3 (switch 20-3).

The switch 1 (switch 20-1):
{flow cookie=1001, Rule="Dst MAC=AA" and "VLAN ID=1", Action="output to port for switch (switch 20-2)"}, and
{flow cookie=1002, Rule="Dst MAC=BB" and "VLAN ID=1", Action="output to port for switch (switch 20-2)"}.

The switch 2 (switch 20-2):
{flow cookie=1001, Rule="Dst MAC=AA" and "VLAN ID=1", Action="output to port for switch (switch 20-3)"},
{flow cookie=1002, Rule="Dst MAC=BB" and "VLAN ID=1", Action="output to port for switch (switch 20-3)"}.

The switch 3 (switch 20-3):
{flow cookie=1001, Rule="Dst MAC=AA" and "VLAN ID=1", Action="output to port for an equipment outside open flow network (OF-NW)"}, and
{flow cookie=1002, Rule="Dst MAC=BB" and "VLAN ID=1", Action="outputs to port for an equipment outside open flow network (OF-NW)"}.

(1) Packet-IN (packet Incoming Message)

When receiving an unknown packet, the switch (switch 20-1) transfers Packet-IN (packet incoming message) to the controller 10 to notify header data of the packet for request of route calculation. Also, the switch 1 (switch 20-1) temporarily stores data of the packet in the buffer. In this case, it is supposed that the header data of the packet is {Dst MAC=CC, tag=30}. Also, it is supposed that identification data (buffer ID) of the buffer in which the packet data is stored is {Buffer ID=001}.

(2) FlowMod-ADD (Flow Entry Change Message)

The controller 10 transmits FlowMod-ADD (flow entry change message) to each switch on a route obtained as a result of the route calculation and registers a flow entry. In this case, it is supposed that the rule of the flow entry is common to the switches on the route, and (Rule="Dst MAC=CC" and "VLAN ID=1"). Also, it is supposed that the action of the flow entry is (Action="output to port for switch 2 (switch 20-2)") to the switch 1 (switch 20-1), (Action="output to port for switch 3 (switch 20-3)") to the switch 2 (switch 20-2), and (Action="output to port for an equipment outside open flow network (OF-NW)") to the switch 3 (switch 20-3).

(3) Packet-OUT (Packet Outgoing Message)

The controller 10 transfers Packet-OUT (packet outgoing message) to the switch 1 (switch 20-1) having transferred Packet-IN (packet incoming message) and instructs it to output the data of the packet stored in the buffer of {Buffer ID=001} to a port for the switch 2 (switch 20-2).

(Processing in Case of Packet Inflow)

FIG. 3 shows an operation example of processing in case of the packet inflow in the present invention.

(1) Step S101

First, it is supposed that an unknown packet flows into the switch 1 (switch 20-1). That is, the switch 1 (switch 20-1) receives the unknown packet which flows into the input port 21.

The unknown packet:
{Dst MAC=CC, tag=30, data}

(2) Step S102

The switch 1 (switch 20-1) adds outer tag data "outer tag=1" to the packet by use of the QinQ function when the unknown packet flows into the input port 21. Thus, the packet becomes a double tag packet.

The double tag packet:
{Dst MAC=CC, outer tag=1, inner tag=30, data}

This outer tag data "outer tag=1" is equivalent to the VLAN tag (VLAN-ID) of a VLAN which is built for only one in open flow network (OF-NW).

(3) Step S103

The switch 1 (switch 20-1) generates a search key based on a value of the header field of the packet, and determines whether or not the flow entry matching the packet has been registered (whether or not the matching flow entry exists), by searches the flow table 23 for the flow entry by use of the search key. At this time, any matching flow entry is not yet registered because the packet is the unknown packet. Therefore, the switch 1 (switch 20-1) obtains the search result that the matching flow entry does not exist.

(4) Step S104

When the matching flow entry does not exist (No at step S103), the switch 1 (switch 20-1) transfers "Packet-IN" to the controller 10 through the secure channel 50 to request route data. The "Packet-IN" is a message to notify the data (header data and so on) of the unknown packet received by the switch to the controller.

"Packet-IN":
{Dst MAC=CC, inner tag=30}

It should be noted that the switch 1 (switch 20-1) stores the packet (double tag packet at this point) in a buffer.

The buffer ID of the switch 1 (switch 20-1):
{Buffer ID=001}

In the present exemplary embodiment, the controller 10 generates data for flow cookies of the flow entry. In this case, the controller 10 generates "flow cookie=1003" as new flow cookie data, and assigns "flow cookie=1003" to the flow entry.

(5) Step S105

When receiving the "Packet-IN", the controller 10 determines appropriate route data and generates a flow entry to which the "flow cookie value=1003" is newly assigned. The controller 10 transfers the "FlowMod-ADD" to each of the switch 1 (switch 20-1), the switch 2 (switch 20-2), and the switch 3 (switch 20-3) on the route so as to register the flow entry. The "FlowMod-ADD" is a control message which instructs the registration (addition) of the flow entry.

In this case, the controller 10 generates "flow cookie=1003" as new flow cookie data and assigns "flow cookie=1003" to the flow entry generated newly based on the route data. The controller 10 transfers the "FlowMod-ADD" to register the flow entry to which the "flow cookie value=1003" is assigned, to the switch 1 (switch 20-1), the switch (switch 20-2), and the switch 3 (switch 20-3).

(6) Step S106

Each of the switch 1 (switch 20-1), the switch 2 (switch 20-2), and the switch 3 (switch 20-3) registers the following flow entry on its own flow table 23 newly according to the instruction of the "FlowMod-ADD".

The switch 1 (The switch 20-1):
{flow cookie=1003, Rule="Dst MAC=CC" and "VLAN ID=1", Action="output to port for switch (switch 20-2)"}.

The switch 2 (The switch 20-2):
{flow cookie=1003, Rule="Dst MAC=CC" and "VLAN ID=1", Action="output to port for switch 3 (switch 20-3)"}.

The switch 3 (The switch 20-3):
{flow cookie=1003, Rule="Dst MAC=CC" and "VLAN ID=1", Action="output to port for an equipment outside open flow network (OF-NW)"}.

(7) Step S107

Also, at this time, the controller 10 carries out mapping of flow cookie data 111 and inner tag data 112 and retains the following mapping in the open flow database 11 newly.

The controller 10:
{flow cookie=1003, inner tag=30}

(8) Step S108

Next, the controller 10 transfers "Packet-OUT" to the switch 1 (switch 20-1) which has transferred "Packet-IN". The "Packet-OUT" is a control message which instructs the output of the packet (transfer start).

"Packet-OUT":
{Action="output to port for switch 2 (switch 20-2)"}.

(9) Step S109

When receiving the "Packet-OUT" from the controller 10, the switch 1 (switch 20-1) outputs the packet stored in the buffer {Buffer ID=001} of the switch 1 (switch 20-1) to the port for the switch 2 (switch 20-2) in response to the action (Action) of "Packet-OUT".

Here, the switch 1 (switch 20-1) may add a buffer ID to the "Packet-IN" and notify it to the controller 10. The controller 10 may add the buffer ID to the "Packet-OUT" and transfer it to the switch 1 (switch 20-1).

It should be noted that when the flow entry matching the flowing packet is already registered (Yes at step S103), the switch 1 (switch 20-1) outputs the packet to the port for the switch 2 (switch 20-2) according to the flow entry when the packet flows in.

(10) Step S110

The switch 2 (switch 20-2) receives the packet relayed by the switch 1 (switch 20-1) and searches the flow table 23 to determine whether or not the matching flow entry is registered.

Because the flow entry matching the packet has been registered on the flow table 23 for this time, the switch 2 (switch 20-2) outputs the packet to the port for the switch 3 (switch 20-3) according to the action (Action) of the flow entry.

(11) Step S111

Similarly, the switch 3 (switch 20-3) outputs the packet to a port for an equipment outside the open flow network (OF-NW) according to the action (Action) of the flow entry has been registered for this time.

At this time, the switch 3 (switch 20-3) removes (deletes) only the outer tag data of "outer tag=1" by use of the QinQ function of the switch, and outputs to the outside of the open flow network (OF-NW).

The output packet to the outside of the open flow network (OF-NW):

{Dst MAC=CC, tag=30, data}

(12) Step S112

Hereinafter, the packets of {Dst MAC=CC, tag=30} which flow into the switch 1 (switch 20-1) are transferred to "the switch 1 (switch 20-1), →the switch 2 (switch 20-2)→ the switch 3 (switch 20-3)" according to the flow entry which has been registered on the flow table 23 of each switch for this time.

(Flow of ToS Value Change)

Next, a flow of processing will be described in which ToS (Type of Service) as one of priority controls is executed to the flow who flows into the open flow network (OF-NW) and the ToS values of the packets (ToS value change) are collectively changed.

It is supposed that in this case, the ToS values of the packets having {Dst MAC=AA, VLAN ID=10} as a part of the header field are collectively changed into "ToS=5" from "ToS=3".

For example, the controller 10 uses a 3-bit field (0-7 values), which is in the ToS field of the header field of the packet, as the ToS value and carries out the priority control of the packet.

The controller 10 retains "flow cookie=1001" corresponding to "inner tag=10" in the open flow database 11.

Therefore, the controller 10 can specify the flow entry having "inner tag=10" by designating "flow cookie=1001" to the flow table 23 of the switch 20 (20-i, i=1 to n) and can change the action (Action) of the flow entry.

The controller 10 transfers "FlowMod-Modify" which specifies the following rewriting action to the flow entry of "flow cookie=1001" to the switch 2 (switch 20-2). "FlowMod-Modify" is a control message which instructs a change (update) of the flow entry.

"FlowMod-Modify":

{flow cookie=1001, Action="rewrite ToS value to 5 and output to port for the switch 3 (switch 20-3)"}

The switch 2 (switch 20-2) rewrites the action of the flow entry on the flow table 23 according to "FlowMod-Modify". That is, the flow entry registered on the flow table 23 of the switch 2 (switch 20-2) is rewritten as follows.

The switch 2 (switch 20-2):

{flow cookie=1001, Rule="Dst MAC=AA" and "VLAN ID=1", Action="rewrite ToS value to 5 and output to port for the switch 3 (switch 20-3)"}.

The switch 1 (switch 20-1) adds "tag=1" by use of the QinQ function when the packet of {Dst MAC=AA, VLAN=10} flows into the input port 21.

The switch 1 (switch 20-1) searches the flow table 23 and according to the hitting flow entry, it transfers a packet to the port for the switch 2 (switch 20-2).

The switch 2 (switch 20-2) rewrites the ToS value of the packet from "ToS=3" to "ToS=5" according to the action of the flow entry registered on the flow table 23 for this time, i.e. ("ToS=3"→"ToS=5") and outputs to a port for the switch 3 (switch 20-3).

The switch 3 (switch 20-3) transfers a packet to the outside of the open flow network (OF-NW) according to the action of the flow entry registered on the flow table 23 for this time, and removes (deletes) "outer tag=1" by use of the QinQ function, to output it.

Therefore, the ToS value of the packet having "inner tag=10" which flows in the open flow network (OF-NW) can be rewritten from "ToS=3" to "ToS=5" ("ToS=3"→"ToS=5").

(Characteristic of this Exemplary Embodiment)

In the present invention, the switch transfers an unknown packet to the controller 10 as "Packet-IN" and the controller 10 carries out the mapping of the inner tag data and the flow cookie data showing the flow entry corresponding to the packet that flows through the open flow network (OF-NW).

Thus, the inner tag data (inner tag) can be identified in the open flow network (OF-NW). Also, a plurality of VLAN can be handled in the open flow network (OF-NW) having only one VLAN.

For example, it is supposed that there are three networks of user network A (NW A), user network B (NW B), and a communication provider network. A case to identify a packet of a user in the communication provider network by use of the QinQ function will be described.

First, the QinQ function of an edge switch of the communication provider network is validated. In this case, when a packet flows through a path of "NW A→communication provider→NW B" the edge switch (on the side of NW A) of the communication provider network gives an extension tag to the packet during the transfer of the packet in "NW A→communication provider" by use of the QinQ function.

Each switch (core switch and so on) in the communication provider network identifies traffic by using this extension tag.

When the packet is transferred through "communication provider→NW B", the edge switch (side of NW B) of the communication provider network removes this extension tag from the packet.

There is not a problem even if the VLAN tag used in the user network overlaps because the extension tag is used in the communication provider network.

It should be noted that when the VLAN tag is added doubly to the packet, the first tag from the head of the packet is referred to as "outer tag data" and the second tag is referred to as "inner tag data".

The role/use field of the inner tag data and the outer tag data are the same as those of the VLAN tag. However, the inner tag data is used only among the user networks. In the same way, outer tag data is used only in the communication provider network.

The role/use of the VLAN tag is used to bind a plurality of VLANs set to the switch.

For example, it is supposed that VLAN1 and VLAN2 are set to the switch B and VLAN1 and VLAN2 are set to the switch A. It is necessary to provide two LAN cables for VLAN1 and VLAN2 between the switch A and the switch B for communication between VLAN1 of the switch A and VLAN1 of the switch B, and communication between VLAN2 of the switch A and VLAN2 of the switch B. By using the VLAN tag, the LAN cable between the switch A and the switch B is enough to be singular. By giving the VLAN tag 1 or the VLAN tag 2 to the packet which flows between the switch A and the switch B, it is possible to identify whether the packet belongs to the VLAN1 or the VLAN2.

(Exemplification of Hardware)

An example of specific hardware to realize the network system according to the present invention will be described below.

As an example of the controller 10, computers such as a PC (personal computer), an appliance, a thin client server, a workstation, a mainframe, a supercomputer are exemplified. It should be noted that the controller 10 may be a relay equipment or a peripheral equipment.

As an example of the switch 20, a network switch, a router, a proxy, a gateway, a firewall, a load balancer (a load distribution equipment), a band control apparatus (packet shaper), a security monitoring and controlling equipment (Supervisory Control And Data Acquisition (SCADA)), a gatekeeper, a base station, an access point (AP), a communication satellite (CS) or a computer having a plurality of communication ports and so on are exemplified.

The controller 10 and the switch 20 may be an expansion board installed in a computer or a virtual machine (VM) is built on a physical machine. Also, the controller 10 and the switch 20 may be installed in moving bodies such as a vehicle, a ship, and an aircraft.

Although not shown, each of the controller 10 and the switch 20 is configured of a processor which executes predetermined processing based on the program, a memory which stores the program and various types of data, and an interface which is used for the communication with the network.

As an example of the above-mentioned processor, a CPU (Central Processing Unit), a network processor (NP), a microprocessor, a microcontroller and a semiconductor integrated circuit (LSI: Large Scale Integration) which has a function of exclusive use are exemplified.

As an example of the above-mentioned memory, a semiconductor memory device such as RAM (Random Access Memory), ROM (Read Only Memory), EEPROM (Electrically Erasable and Programmable Read Only Memory) and a flash memory, an auxiliary storage such as HDD (Hard Disk Drive) and SSD (Solid State Drive), a removable disk such as DVD (Digital Versatile Disk) and storage media such as an SD memory card (Secure Digital memory card) and so on are exemplified. Also, the memory may be a buffer, a register and so on. Or, the memory may be a storage apparatus using DAS (Direct Attached Storage), FC-SAN (Fibre Channel—Storage Area Network), NAS (Network Attached Storage), IP-SAN (IP—Storage Area Network), and so on.

It should be noted that the above-mentioned processor and the above-mentioned memory may be unified. For example, in recent years, a 1-chip microcomputer is been developed. Therefore, a case is thought of that the 1-chip microcomputer which is installed in the electronic equipment is provided with the above-mentioned processor and the above-mentioned memory.

As an example of the above-mentioned interface, the substrate corresponding to the network communication (motherboard, and I/O board) and a semiconductor integrated circuit of a chip, a network adapter and a similar expansion card such as NIC (Network Interface Card), a communication device such as an antenna, and a communication port such as a connection mouth (connector) are exemplified.

Also, as an example of the network, the Internet, LAN (Local Area Network), wireless LAN (Wireless LAN), WAN (Wide Area Network), backbone, CATV line, fixation telephone network, mobile phone network, WiMAX (IEEE 802.16a), 3G (3rd Generation), dedicated line (leased line), IrDA (Infrared Data Association), Bluetooth (registered trademark), a serial communication line, a data bus and so on are exemplified.

It should be noted that the internal component of each of the controller 10 and the switch 20 may be module (module), component (component), an exclusive use device or these start-up (summon) programs.

However, actually, the present invention is not limited to these examples.

(Summary)

As mentioned above, in the present invention, the controller maps the inner tag data assigned to packets flowing through the open flow network (OF-NW) and the flow cookie data showing a flow entry corresponding to the packets which flow through the the open flow network, and retains the data.

By specifying the flow cookie data, a plurality of VLANs can be handled in the network having only one VLAN (for example, in the open flow network having only one VLAN).

Specifically, a flow flowing into the open flow network is transferred from the switch to the controller. The controller learns "VLAN ID" data in the input of the open flow network, and maps this "VLAN ID" and the flow cookie data showing the flow entry corresponding to the packet in the open flow network. Thus, the controller can handle a plurality of VLANs.

Also, the controller can manage the inner tag data in the input of the open flow network and the flow flowing through the open flow network to relate them. Thus, the controller can virtually handle a plurality of VLANs (multiple VLANs) irrespective of using only one VLAN in the open flow network.

<Supplement>

Part or all of the above-mentioned exemplary embodiments can be mentioned in the following supplemental notes. However, actually, the present invention is not limited to the following specified examples.

(Supplemental Note 1)

A controller includes: means for setting a flow entry defining a rule and an action to uniformly control packets as a flow, on a flow table of a switch; means for virtually treating a plurality of VLANs (Virtual Local Area Network) by mapping tag data given to the packets which flow through a network and flow cookie data showing the flow entry corresponding to the packets which flow through the network to retain them.

(Supplemental Note 2)

The controller according to supplemental note 1, wherein means for setting to the flow entry, the flow cookie data which uniquely specifies the flow entry, in addition to the rule and the action; means for mapping and retaining identification data (VLAN ID) which uniquely specifies each of a plurality of VLANs outside the network as the tag data, and the flow cookie data; and means for specifying the flow entry by using the flow cookie data and updating the action of the flow entry.

(Supplemental Note 3)

The controller according to supplemental note 2 further includes: means for executing ToS (Type of Service) as one of the priority controls to a flowing flow, and updating the action so as to collectively change the ToS values of the packets, when specifying the flow entry by using the flow cookie data and updating the action of the flow entry.

(Supplemental Note 4)

A switch includes: means for setting to a flow table of said switch, a flow entry defining a rule and an action to uniformly control packets as a flow, according to the control from the controller; and a unit for virtually corresponding to a plurality of VLANs (Virtual Local Area Network) based on the flow entry according to the mapping of the tag data given to the packets which flow through the network and the flow cookie data showing the flow entry corresponding to the packets which flow through said network in said controller.

(Supplemental Note 5)

The switch according to supplemental note 4, further includes: means for setting the tag data given to the packets which flow through the network, as inner tag data showing the identification data (VLAN ID) of VLAN used outside said network, when said switch is provided at an ingress and a unknown packet flows in;

a unit for adding outer tag data which uniquely specifies the VLAN which is used for the packets in said network double tag packet by a QinQ function (IEEE802.1q Tunneling);

a unit for outputting the packet to a predetermined according to the flow entry set by said controller; and a unit for deleting the outer tag data from the packet by using the QinQ function in case of being in the egress.

<Remarks>

The above exemplary embodiments of the present invention have been described in detail. However, actually, the present invention is not limited to the above-mentioned exemplary embodiments, and it is contained in the present invention even if there is a change of the range which does not deviate from the point of the present invention.

It should be noted that this application claims an apriority on convention in based on Japan Patent Application No. 2011-072153. The disclosure thereof is incorporated herein by reference.

The invention claimed is:

1. A network system comprising:
   switches, each of which includes a flow table; and
   a controller configured to set a flow entry defining a rule and an action to uniformly control packets as a flow, in the flow table of each of said switches,
   wherein said controller is configured:
      to include a database to map tag data given to each of packets flowing through a network and flow cookie data showing the flow entry corresponding to the packet so as to virtually handle a plurality of VLANs (Virtual Local Area Network);
      to set the flow cookie data which specifies the flow entry in addition to the rule and the action, to the flow entry;
      to map identification data (VLAN ID) as the tag data and the flow cookie data, wherein the identification data is data which specifies each of said plurality of VLANs outside said network;
      to register a mapping result of the identification data and the flow cookie data, to the database; and
      to specify the flow entry by using the flow cookie data and updating the action of the flow entry, and
   wherein a switch of said switches is configured:
      to set the tag data, which is given to each of packets flowing through the network, as inner tag data showing identification data (VLAN ID) of the VLAN used outside said network when said switch is in an input of said network and an unknown packet flows in said switch;
      to set a double tag packet by adding outer tag data to uniquely specify the VLAN used in said network to each packet by a QinQ function (IEEE802.1q Tunneling);
      to output the packets from a predetermined output port based on the flow entry set from said controller; and
      to delete the outer tag data from the packet by use of the QinQ function when said switch is in an output of said network.

* * * * *